(12) United States Patent
Jung et al.

(10) Patent No.: US 10,664,409 B2
(45) Date of Patent: May 26, 2020

(54) DATA STORAGE APPARATUS UTILIZING SEQUENTIAL MAP ENTRY FOR RESPONDING TO READ REQUEST AND OPERATING METHOD THEREOF

(71) Applicant: SK hynix Inc., Gyeonggi-do (KR)

(72) Inventors: In Jung, Gyeonggi-do (KR); Byeong Gyu Park, Gyeonggi-do (KR); Young Ick Cho, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 22 days.

(21) Appl. No.: 16/110,420

(22) Filed: Aug. 23, 2018

(65) Prior Publication Data
US 2019/0220416 A1 Jul. 18, 2019

(30) Foreign Application Priority Data
Jan. 16, 2018 (KR) ........................ 10-2018-0005728

(51) Int. Cl.
*G06F 12/1009* (2016.01)
(52) U.S. Cl.
CPC .. *G06F 12/1009* (2013.01); *G06F 2212/1056* (2013.01); *G06F 2212/45* (2013.01)
(58) Field of Classification Search
CPC ......... G06F 12/1009; G06F 2212/1056; G06F 2212/45
USPC .......................................................... 711/3
See application file for complete search history.

(56) References Cited

U.S. PATENT DOCUMENTS

| | | | | |
|---|---|---|---|---|
| 6,330,654 | B1 * | 12/2001 | LaBerge | G06F 12/1027 711/207 |
| 7,434,032 | B1 * | 10/2008 | Coon | G06F 9/3838 712/217 |
| 9,514,057 | B2 * | 12/2016 | Marcu | G06F 12/0246 |
| 10,031,845 | B2 * | 7/2018 | Hady | G06F 12/0246 |
| 2015/0169465 | A1 * | 6/2015 | Slepon | G06F 12/1009 711/103 |

(Continued)

FOREIGN PATENT DOCUMENTS

KR 101654774 9/2016

OTHER PUBLICATIONS

Novotný R., Kadlec J. and Kuchta R. (2015). NAND Flash Memory Organization and Operations. Journal of Information Technology & Software Engineering, vol. 5, issue 1, 8 p. (Year: 2015).*

*Primary Examiner* — Reginald G Bragdon
*Assistant Examiner* — Aaron D Ho
(74) *Attorney, Agent, or Firm* — IP & T Group LLP

(57) ABSTRACT

A data storage apparatus includes a nonvolatile memory device including block groups, a random access memory including a sequential map table that stores a sequential map entry for consecutive sequential write logical addresses, among write addresses received from a host apparatus, greater than or equal to a predetermined threshold number, and a processor configured to determine whether or not first sequential write logical addresses are present among logical addresses corresponding to physical addresses for a first region of a first block group when a write operation for the first region of the first block group in response to a write request received from the host apparatus is completed, generate a first sequential map entry for the first sequential write logical addresses when the first sequential write logical addresses are present, and store the first sequential map entry in the sequential map table.

18 Claims, 15 Drawing Sheets

(56) References Cited

U.S. PATENT DOCUMENTS

2017/0147502 A1* 5/2017 Byun .................. G06F 12/1009

* cited by examiner

FIG.2A

AMT

| MS Index | Logical Address | Physical Address |
|---|---|---|
| MS0 | LBA0 | PBA0 |
|  | LBA1 | PBA1 |
|  | ⋮ | ⋮ |
|  | LBAm | PBAm |
| ⋮ | ⋮ | ⋮ |
| MSn | LBA0 | PBA0 |
|  | LBA1 | PBA1 |
|  | ⋮ | ⋮ |
|  | LBAm | PBAm |

L2P entry

| P2L Table | | | | | | | |
|---|---|---|---|---|---|---|---|
| S1 | S2 | S3 | S4 | S5 | S6 | S7 | S8 |
| | | | | | | | |
| S9 | S10 | S11 | S12 | S13 | S14 | S15 | S16 |
| | | | | | | | |
| ⋮ | | | | | | | |
| S57 | S58 | S59 | S60 | S61 | S62 | S63 | S64 |
| | | | | | | | |

▨ PBA
☐ LBA

FIG.5B

SMT

| SME Index | Start LBA | LBA length | Start PBA (Super Block/Sector) | |
|---|---|---|---|---|
| 1 | LBA | Value | SB Index | Sector Index |
| 2 | LBA | Value | SB Index | Sector Index |
| 3 | LBA | Value | SB Index | Sector Index |
| ⋮ | ⋮ | ⋮ | ⋮ | ⋮ |
| i | LBA | Value | SB Index | Sector Index |

Sequential Map Entry (row 1 highlighted)

SMT

| SME Index | Start LBA | LBA length | Start PBA (Super Block/Sector) | |
|---|---|---|---|---|
| 1 | LBA1 | 400 | 10 | 1 |
| 2 | LBA401 | 200 | 11 | 1 |
| 3 | LBA800 | 400 | 13 | 10 |
| ⋮ | ⋮ | ⋮ | ⋮ | ⋮ |
| i | - | - | - | - |

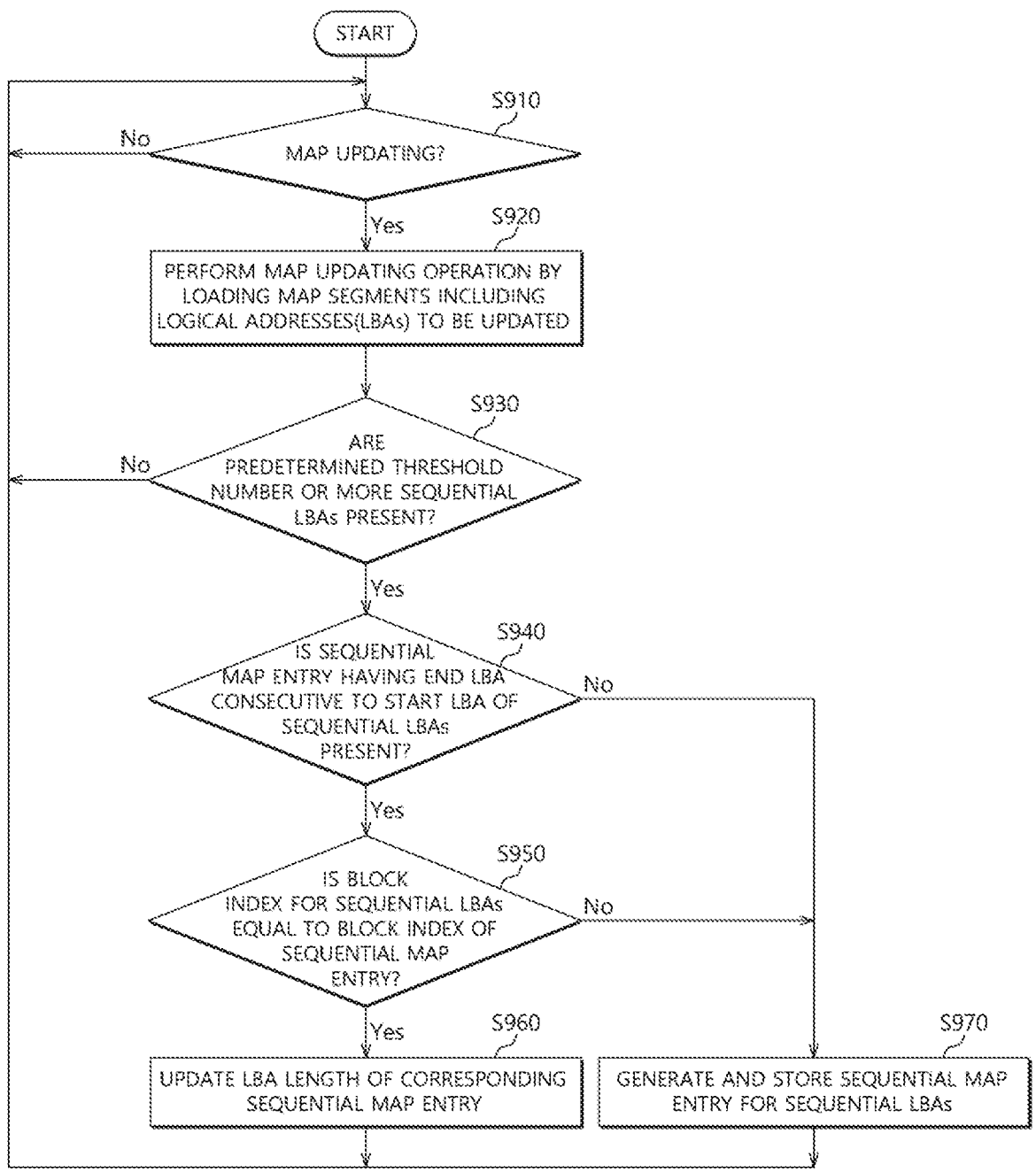

DATA STORAGE APPARATUS UTILIZING SEQUENTIAL MAP ENTRY FOR RESPONDING TO READ REQUEST AND OPERATING METHOD THEREOF

CROSS-REFERENCES TO RELATED APPLICATION

The present application claims priority under 35 U.S.C. § 119(a) to Korean patent application number 10-2018-0005728, filed on Jan. 16, 2018, in the Korean Intellectual Property Office, which is incorporated herein by reference in its entirety.

BACKGROUND

1. Technical Field

Various embodiments of the present invention generally relate to a semiconductor apparatus. Particularly, the embodiments relate to a data storage apparatus and an operating method thereof.

2. Related Art

The computing environment paradigm has recently changed to ubiquitous computing, which enables computer systems to be used anytime and anywhere. As a result, use of portable electronic apparatuses such as mobile phones, digital cameras, and laptop computers has been increasing rapidly. Generally, portable electronic apparatuses use data storage apparatuses that employ memory devices. Data storage apparatuses may be used to store data used in the portable electronic apparatuses.

Since they have no mechanical driving units, data storage apparatuses using memory devices have advantages such as good stability and endurance, high information access rate, and low power consumption. Such data storage apparatuses may include a universal serial bus (USB) memory device, a memory card having various interfaces, a universal flash storage (UFS) device, a solid state drive (SSD), and the like.

SUMMARY

Embodiments are provided to a data storage apparatus with improved read performance and an operating method thereof.

In an embodiment of the present disclosure, a data storage apparatus may include: a nonvolatile memory device including a plurality of block groups; a random access memory including a sequential map table that stores a sequential map entry for consecutive sequential write logical addresses, among write addresses received from a host apparatus, greater than or equal to a predetermined threshold number; and a processor configured to determine whether or not first sequential write logical addresses are present among logical addresses corresponding to physical addresses for a first region of a first block group when a write operation for the first region of the first block group in response to a write request received from the host apparatus is completed, generate a first sequential map entry for the first sequential write logical addresses when the first sequential write logical addresses are present, and store the first sequential map entry in the sequential map table.

In an embodiment of the present disclosure, an operating method of a data storage apparatus, the method may include: determining whether or not consecutive first sequential logical addresses that are greater than or equal to a predetermined threshold number are present based on physical to logical (P2L) entries stored in an address buffer when map updating operation is performed; and generating a first sequential map entry including a start logical address for the first sequential logical addresses, a logical address length, and a start physical address corresponding to the start logical address when the first sequential logical addresses are present.

In an embodiment of the present disclosure, a memory system may include: a memory device; and a controller configured to generate, during a write operation, a sequential map entry having a start logical address, length of consecutive logical addresses from the start logical address and a start physical address corresponding to the start logical address; and control the memory device to perform a read operation by providing a read-requested physical address. The controller obtains the read-requested physical address based on the start logical address, a read-requested logical address, and the start physical address.

According to embodiments, a sequential map entry for preset threshold number or more consecutive sequential logical addresses may be separately generated and stored in the random access memory and the sequential logical addresses may be converted to corresponding physical addresses using the sequential map entry in response to a random read request from a host apparatus. Accordingly, the unnecessary map read operation is reduced and thus random read performance may be improved.

As logical to physical (L2P) entries for a sequential write may be simplified and then stored as one sequential map entry only including a start logical address, a logical address length, and a start physical address, a space for map data storage may be reduced and a map coverage may be improved.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 2A is a diagram illustrating a configuration example of a nonvolatile memory device of FIG. 1;

FIG. 2B is a diagram illustrating a configuration example of a super block of FIG. 2A;

FIG. 5A is a conceptual diagram illustrating an address buffer (AB) of FIG. 4;

FIG. 5B is a conceptual diagram illustrating a sequential map table (SMT) of FIG. 4;

FIG. 6A is a diagram illustrating an example of a sequential write and random write according to an embodiment of the present disclosure;

FIG. 6B is a diagram illustrating an example of generating and storing a sequential map entry in the sequential write of FIG. 6A;

FIG. 9 is a flowchart illustrating an operation method of a data storage apparatus according to an embodiment of the present disclosure;

DETAILED DESCRIPTION

Figure 1:
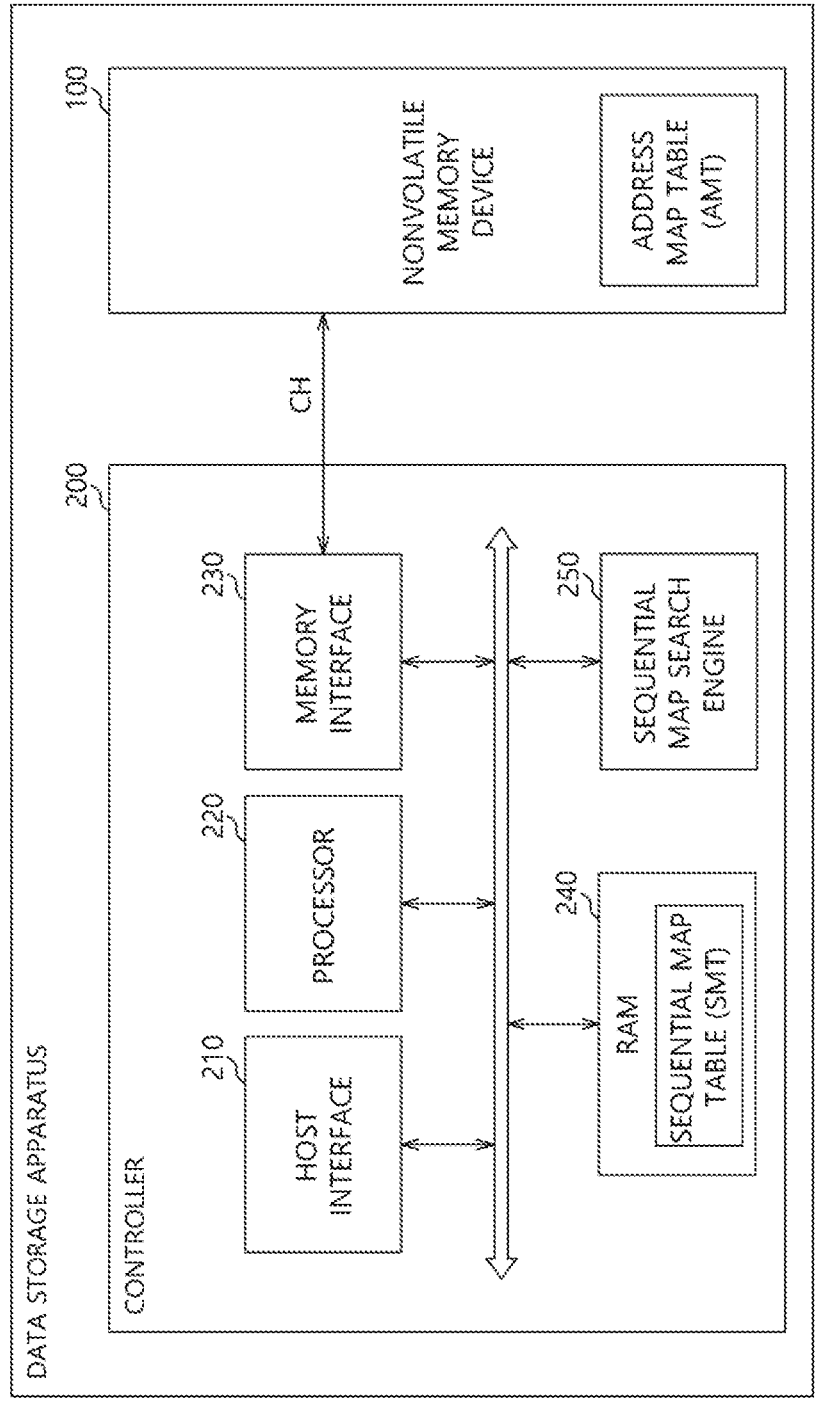
FIG. 1 is a block diagram illustrating a configuration example of a data storage apparatus according to an embodiment of the present disclosure.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention. It is noted that reference to "an embodiment" does not necessarily mean only one embodiment, and different references to "an embodiment" are not necessarily to the same embodiment(s).

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms may include the plural forms as well and vice versa, unless the context clearly indicates otherwise.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

FIG. 1 is a block diagram illustrating a configuration example of a data storage apparatus 10 according to an embodiment. The data storage apparatus 10 according to an embodiment may store data to be accessed by a host apparatus (not shown) such as, for example, a mobile phone, an MP3 player, a laptop computer, a desktop computer, a game player, a television (TV), or an in-vehicle infotainment system, and the like. The data storage apparatus 10 may refer to a memory system.

The data storage apparatus 10 may be manufactured as any one among various types of storage apparatuses according to a host interface which refers to a transfer protocol with a host apparatus (not shown). For example, the data storage apparatus 10 may be configured of any one of various types of storage apparatuses, such as a solid state drive (SSD), a multimedia card in the form of an MMC, an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, a memory stick, and the like.

The data storage apparatus 10 may be manufactured as any one among various types of packages. For example, the data storage apparatus 10 may be manufactured as any one of various types of packages, such as a package on package (POP), a system in package (SIP), a system on chip (SOC), a multi-chip package (MCP), a chip on board (COB), a wafer-level fabricated package (WFP), and a wafer-level stack package (WSP).

Referring to FIG. 1, the data storage apparatus 10 may include a nonvolatile memory device 100 and a controller 200.

The nonvolatile memory device 100 may be operated as a storage medium of the data storage apparatus 10. Non-limiting examples of the nonvolatile memory device 100 may include any one of various types of nonvolatile memory devices, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (RERAM) using a transition metal compound, according to a memory cell constituting the nonvolatile memory device.

The nonvolatile memory device 100 may include a memory cell array including a plurality of memory cells (not shown) arranged in regions in which a plurality of word lines (not shown) and a plurality of bit lines (not shown) cross each other. The memory cell array may include a plurality of memory blocks and each of the plurality of memory blocks may include a plurality of pages.

For example, each of the memory cells in the memory cell array may be at least one among a single level cell (SLC) in which a single bit data (for example, 1-bit data) is stored, a multilevel cell (MLC) in which 2-bit data is stored, a triple level cell (TLC) in which 3-bit data is stored, and a quad level cell QLC in which 4-bit data is stored. The memory cell array may include at least one or more cells among the SLC, the MLC, the TLC, and the QLC. For example, the memory cell array may include memory cells having a two-dimensional (2D) horizontal structure or memory cells having a 3D vertical structure.

Figure 2A:
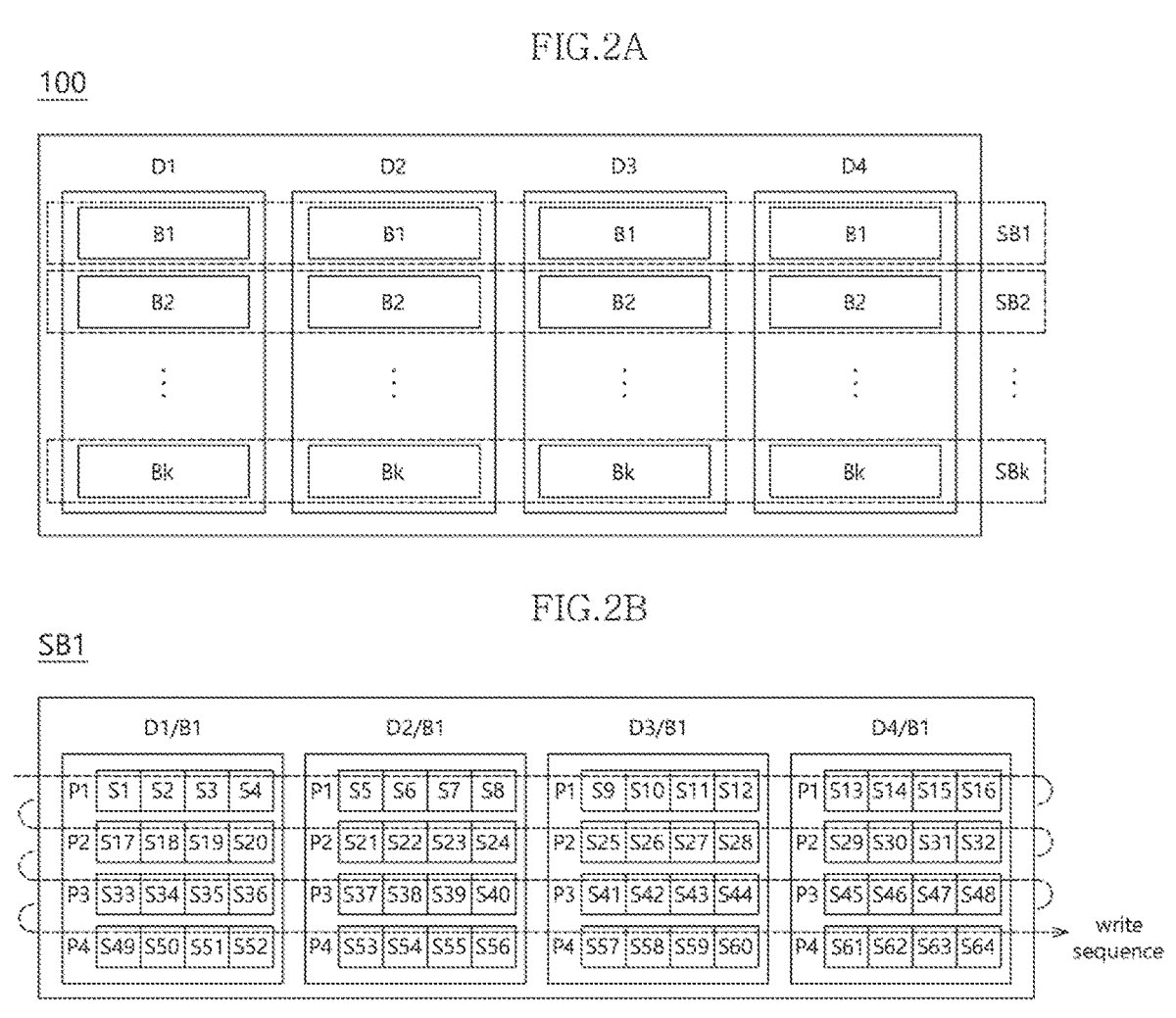

FIG. 2A is a diagram illustrating a configuration example of a nonvolatile memory device of FIG. 1 and FIG. 2B is a diagram illustrating a configuration example of a super block of FIG. 2A. Although the example of a first super block SB1 is illustrated in FIG. 2A, the other super blocks, for example, second to k-th super blocks SB2 to SBk may have the same configuration as the configuration of the first super block SB1. Although FIG. 2A shows, as an example, that the nonvolatile memory device 100 includes four dies D1 to D4, the number of dies included in the nonvolatile memory device 100 is not limited thereto. Although FIG. 2B shows, as an example, that the four pages P1 to P4 are included in one block B and four sectors S are included in each of the pages P1 to P4, the number of pages included in each block and the number of sectors included in each page are not limited thereto.

Referring to FIG. 2A, the nonvolatile memory device 100 may include first to fourth dies D1 to D4. Each of the first to fourth dies D1 to D4 may include a plurality of memory blocks B1 to Bk. Although not shown in FIG. 2A, each of the dies D1 to D4 may include a plurality of planes including a plurality of memory blocks.

Referring to FIG. 2A, the same memory blocks in the dies D1 to D4 may be grouped into one memory block group. The one memory block group in which the same memory blocks in the dies D1 to D4 are grouped may refer to a super block. The first memory blocks B1 in the dies D1 to D4 may be grouped into and used as the first super block SB1. The nonvolatile memory device 100 may include k super blocks, for example, first to k-th super blocks SB1 to SBk. The controller 200 may operate the four memory blocks included in each of the super blocks SB1 to SBk in parallel.

For example, the controller 200 may control the nonvolatile memory device 100 to simultaneously perform the read/write operation on four first memory blocks B1 included in the first super block SB1. Referring to FIG. 2B, each of the four first memory blocks B1 included in the first super block SB1 may include four pages P1 to P4 and each of the pages P1 to P4 may include four sectors S. Accordingly, the first super block SB1 may include total 64 sectors S1 to S64.

Write data received from a host apparatus may be sequentially stored in the first super block SB1 in an arrow direction indicated by a dotted line in FIG. 2B. For example, the write data may be sequentially stored from a first sector S1 to a 64-th sector in a write operation for the first super block SB1. When the write data are stored from the first sector to the 64-th sector, map updating operation on the first super block SB1 may be performed. The map updating operation may refer to an operation of mapping a physical block address (PBA: hereinafter, referred to as physical address) to each of logical block addresses (LBAs: hereinafter, referred to as logical addresses) which are received from a host apparatus. The physical address PBA may include an index of the super block SB in which the write data are stored and an index of the sector.

An address map table AMT (shown in FIG. 3) may be stored in the nonvolatile memory device 100. The address map table AMT may store mapping information between the logical address LBA received from a host apparatus and the physical address PBA corresponding to the logical address LBA.

Figures 3, 4:
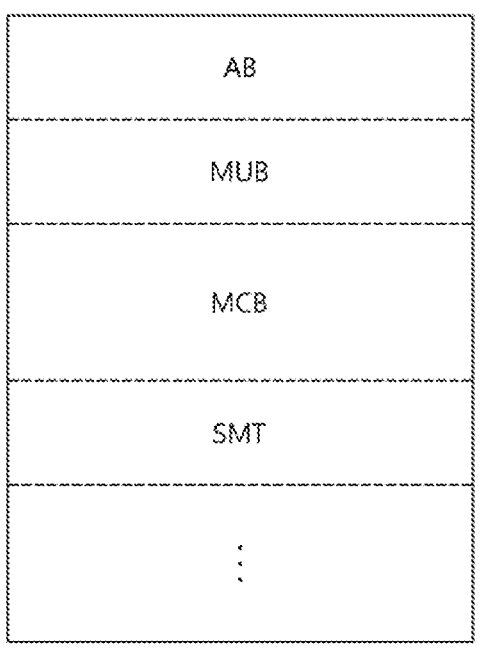
FIG. 3 is a diagram illustrating a configuration example of an address map table (AMT) according to an embodiment of the present disclosure.
FIG. 4 is a diagram illustrating a configuration example of a random access memory according to an embodiment of the present disclosure.

FIG. 3 is a diagram illustrating a configuration example of the address map table AMT according to an embodiment. Referring to FIG. 3, the address map table AMT may include a plurality of map segments MS0 to MSn. Each of the map segments MS0 to MSn may include a plurality of logical addresses LBA0 to LBAm and a plurality of physical addresses PBAO to PBAm corresponding to the plurality of logical addresses LBA0 to LBAm. When the mapping information between one logical address LBA and one physical address PBA refers to a logical to physical (L2P) entry, each of the map segments MS0 to MSn may include m L2P entries.

When an address buffer AB (shown in FIG. 4) in which P2L entries are stored has no empty space, the address map table AMT may be updated, but the updating timing is not limited thereto. The updating of the mapping information stored in the address map table AMT may refer to map updating operation. The address map table AMT may be updated in map segment units.

The controller 200 may include a host interface 210, a processor 220, a memory interface 230, a random access memory (RAM) 240, and a sequential map search engine 250.

The host interface 210 may perform interfacing between a host apparatus (not shown) and the data storage device 10. By way of example and not limitation, the host interface 210 may communicate with the host apparatus through any one among standard transfer protocols such as a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-E protocol.

The processor 220 may be a micro control unit (MCU) and a central processing unit (CPU). The processor 220 may process a request received from a host apparatus. To process the request received from the host apparatus, the processor 220 may drive a code-type instruction or algorithm (for example, software) loaded into the RAM 240 and control internal function blocks and the nonvolatile memory device 100.

The memory interface 230 may control the nonvolatile memory device 100 according to control of the processor 220. The memory interface 230 may refer to a memory controller. The memory interface 230 may provide control signals to the nonvolatile memory device 100. The control signals may include a command, an address, and the like for controlling the nonvolatile memory device 100. The memory interface 230 may provide data to the nonvolatile memory device 100 or receive data from the nonvolatile memory device 100. The memory interface 230 may be coupled to the nonvolatile memory device 100 through a channel CH including one or more signal lines.

The RAM 240 may be a random access memory such as a dynamic RAM (DRAM) or a static RAM (SRAM). The RAM 240 may store software driven through the processor 220. The RAM 240 may store data (for example, meta data) required for the driving of the software. For example, the RAM 240 may be operated as a working memory of the processor 220.

The RAM 240 may temporarily store data to be transmitted from a host apparatus to the nonvolatile memory device 100 or data to be transmitted from the nonvolatile memory device 100 to the host apparatus. For example, the RAM 240 may be operated as a data buffer memory or a data cache memory.

FIG. 4 is a diagram illustrating a configuration example of the RAM 240 according to an embodiment.

Referring to FIG. 4, the RAM 240 may include the address buffer AB, a map update buffer MUB, a map cache buffer MCB, a sequential map table SMT, and the like.

The address buffer AB may store the mapping information, for example, a logical address LBA received from a host apparatus and a physical address PBA of the nonvolatile memory 100 in which write data is stored. The address mapping information stored in the address buffer AB may be the P2L entry. The address map table AMT of the nonvolatile memory device 100 may be updated based on the P2L entry stored in the address buffer AB.

The address buffer AB, the map update buffer NUB, the map cache buffer MCB, and the sequential map table SMT will be described in more detail below.

FIG. 5A is a conceptual diagram illustrating the address buffer AB of FIG. 4.

Referring to FIG. 5A, the address buffer AB may include regions each of which corresponds to the sectors S1 to S64 included in an arbitrary super block SB. The arbitrary super block SB may correspond to a super block which is currently used for example, a super block on which a write operation is currently performed. When the logical addresses LBAs are received from a host apparatus, each of the logical addresses LBAs may be matched with and stored in one sector S among the sectors S1 to S64. The one logical address LBA mapped with the one sector S may refer to the P2L entry. The physical address PBA may include an index of the using super block SB and an index of each of the sectors S1 to S64.

The map update buffer MUB may temporarily store L2P entries of at least one or more map segments as an update target among the plurality of map segments MS0 to MSn stored in the address map table AMT of the nonvolatile memory device 100. The physical addresses PBAs for the L2P entries temporarily stored in the map update buffer MUB may be changed based on the P2L entries stored in the address buffer AB. As the L2P entries in which the physical addresses PBAs are changed may be written in the address map table AMT of the nonvolatile memory device 100, the updating of the address map table AMT, for example, a map updating operation may be completed.

The map cache buffer MCB may cache map data corresponding to a logical address which is recently read-requested from a host apparatus or a logical address which is frequently read-requested from the host apparatus. The map data cached in the map cache buffer MCB may be the L2P entries.

The sequential map table SMT may store the sequential map entries for consecutive logical addresses LBAs greater than or equal to a predetermined threshold number, based on the P2L entries stored in the address buffer AB. The sequential map entries may be generated and stored in the sequential map table SMT when the map updating operation is performed.

FIG. 5B is a conceptual diagram illustrating the sequential map table SMT of FIG. 4.

Referring to FIG. 5B, the sequential map table SMT may include one or more sequential map entry indexes SME Index, and one or more sequential map entries SME. The sequential map table SMT may have regions in which i sequential map entries 1 to i are stored. Each of the sequential map entries SME may be configured to include a start logical address Start LBA, a logical address length LBA length, and a start physical address Start PBA.

For example, when the write operation for the arbitrary super block SB is completed, the map updating operation may be performed. The processor 220 may determine whether or not consecutive logical addresses LBAs (i.e., sequential logical address) that are greater than or equal to the predetermined threshold number are present by scanning the P2L entries stored in the address buffer AB. When the sequential logical addresses are present, the processor 220 may generate a sequential map entry SME which includes values indicating a start logical address Start LBA of the sequential logical addresses, a logical address length LBA length, and a start physical address Start PBA corresponding to the start logical address of the sequential logical addresses and store the generated sequential map entry SME in the sequential map table SMT.

FIG. 6A is a diagram illustrating an example when P2L entries are stored in the address buffer AB in a sequential write and a random write according to an embodiment. FIG. 6B is a diagram illustrating an example of generating and storing a sequential map entry SME of the sequential write of FIG. 6A into the sequential map table SMT. For clarity, it is assumed that a write operation is performed on a 10-th super block SB10. Further, it is assumed that the predetermined threshold number of logical addresses for determining whether to or not correspond to the sequential logical addresses in this particular embodiment is 30. However, it is to be noted that the present disclosure is not limited thereto. That is, the write operation may be performed on any super block, and the predetermined threshold number may be any suitable number depending on design.

Referring to FIG. 6A, as write data for a first write command WCMD1 received from a host apparatus are stored in first to 48-th sectors S1 to S48 of the 10-th super block SB10, write logical addresses LBA1 to LBA48 corresponding to the first write command WCMD1 may be mapped with the corresponding sectors S1 to S48 and information indicating that mapping relationship may be stored in the address buffer AB. Next, as write data for a second write command WCMD2 received from the host apparatus are stored in 49-th to 56-th sectors S49 to S56 of the 10-th super block SB10, write logical addresses LBA1401 to LBA1408 corresponding to the second write command WCMD2 may be mapped with the corresponding sectors S49 to S56 and information indicating that mapping relationship may be stored in the address buffer AB. Lastly, as write data for a third write command WCMD3 received from the host apparatus are stored in 57-th to 64-th sectors S57 to S64 of the 10-th super block SB10, write logical addresses LBA1501 to LBA1508 corresponding to the third write command WCMD3 may be mapped with the corresponding sectors S57 to S64 and information indicating that mapping relationship may be stored in the address buffer AB.

As the use of the 10-th super block is completed, the map updating operation may be performed. As described above, the map updating operation may be performed by storing the map segments MS, which include the write logical addresses LBA1 to LBA48, LBA1401 to LBA1408, and LBA1501 to LBA1508 in the address map table AMT stored in the nonvolatile memory device 100, in the map update buffer MUB, changing the physical addresses PBAs corresponding to the write logical addresses LBA1 to LBA48, LBA14O1 to LBA1408, and LBA1501 to LBA1508 to the super block index (for example, 10) and the sector indexes (for example, 1 to 64), and restoring the map segments MS including the write logical addresses LBA1 to LBA48, LBA1401 to LBA1408, and LBA1501 to LBA1508, in which the physical addresses PBAs are changed, in the nonvolatile memory device 100.

While the map updating operation is performed, the processor 220 may determine whether or not consecutive sequential logical addresses that are greater than or equal to the predetermined threshold number (for example, 30) are present based on the P2L entries stored in the address buffer AB. As illustrated in FIG. 6A, since the sequential logical addresses, for example, the first to 48-th logical addresses LBA1 to LBA48, is greater than the predetermined threshold number (for example, 30), the processor 220 may determine that the first to 48-th logical addresses LBA1 to LBA48 correspond to the sequential logical addresses, generate the sequential map entry SME for the corresponding logical addresses LBA1 to LBA48, and store the sequential map entry SME in the sequential map table SMT.

As illustrated in FIG. 6B, the sequential map table SMT may include values representing 'LBA1' as the start logical address Start LBA of the sequential map entry SME for the first to 48-th logical addresses LBA1 to LBA48, '48' as the logical address length LBA length, and '10' as the super block index and '1' as the sector index for the start physical address Start PBA.

Figure 7A:
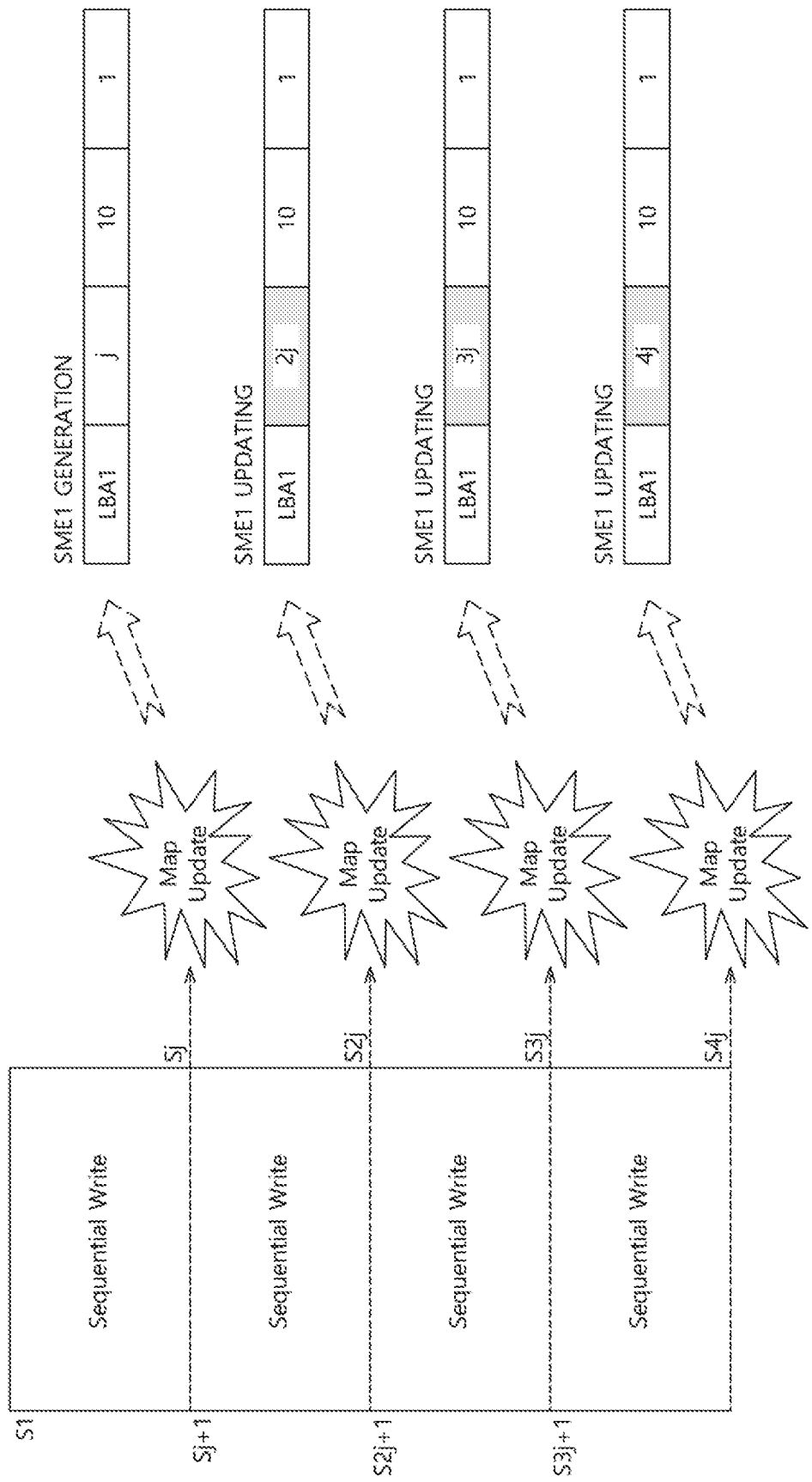
FIG. 7A is a diagram illustrating an example of generating and updating a sequential map entry when a plurality of map updating operations are performed with respect to a sequential write performed in one super block according to an embodiment of the present disclosure.

FIG. 7A is a diagram illustrating an example of generating and updating a sequential map entry SME when a plurality of map updating operations are performed with respect to a sequential write performed in one super block according to an embodiment. For clarity, it is assumed that a sequential write operation is performed on the whole 10-th super block SB illustrated in FIG. 7A.

A size of the address buffer AB in the RAM 240 may be smaller than that of the super block SB. FIG. 7A illustrates an example when the size of the super block SB is four times larger than that of the address buffer AB. When the address buffer AB is completely filled with the P2L entries, the map updating operation may be performed. Accordingly, the map updating operation may be performed four times until the write operation for the 10-th super block SB10 can be completed.

For example, when the 10-th super block SB10 includes first to 4$j$-th sectors S1 to S4$j$ and the address buffer AB includes first to $j$-th mapping regions, the map updating operation may be performed whenever the write operations for first to $j$-th sectors S1 to S$j$, $j$+1-th to 2$j$-th sectors S$j$+1 to S2$j$, 2$j$+1-th to 3$j$-th sectors S2$j$+1 to S3$j$, and 3$j$+1-th to 4-th sectors S3$j$+1 to S4$j$ of the 10-th super block SB10 are completed.

When the write operation for the first to j-th sectors S1 to S$j$ of the 10-th super block SB10 is completed, the map updating operation may be performed and the processor 220 may generate a sequential map entry SME1 for the sequential logical addresses LBA1 to LBA$j$. The generated sequential map entry SME1 may include values indicating 'LBA1' as the start logical address, as the logical address length LBA length, and '10' as the super block index and '1' as the sector index for the start physical address Start PBA.

When the write operation for the $j$+1-th to 2$j$-th sectors S$j$+1 to S2$j$ of the 10-th super block SB10 is completed, the map updating operation may be performed and the processor 220 may determine whether or not a sequential map entry SME having an end logical address LBA$j$ consecutive to the start logical address LBA$j$+1 of the sequential logical addresses LBA$j$+1 to LBA2$j$ is present in the sequential map table SMT. Since the sequential map entry SME1 having the end logical address LBA$j$ is stored in the sequential map table SMT, the processor 220 may update the logical address length LBA length to '2$j$' in the corresponding sequential map entry SME1.

Similarly, whenever the write operations for the 2$j$+1-th to 3$j$-th sectors S2$j$+1 to S3$j$ and 3$j$+1-th to 4$j$-th sectors S3$j$+1 to S4$j$ of the 10-th super block SB10 are completed, the processor 220 may sequentially update the logical address lengths LBA length to '3$j$' and '4$j$' in the sequential map entry SME1 stored in the sequential map table SMT.

Figure 7B:
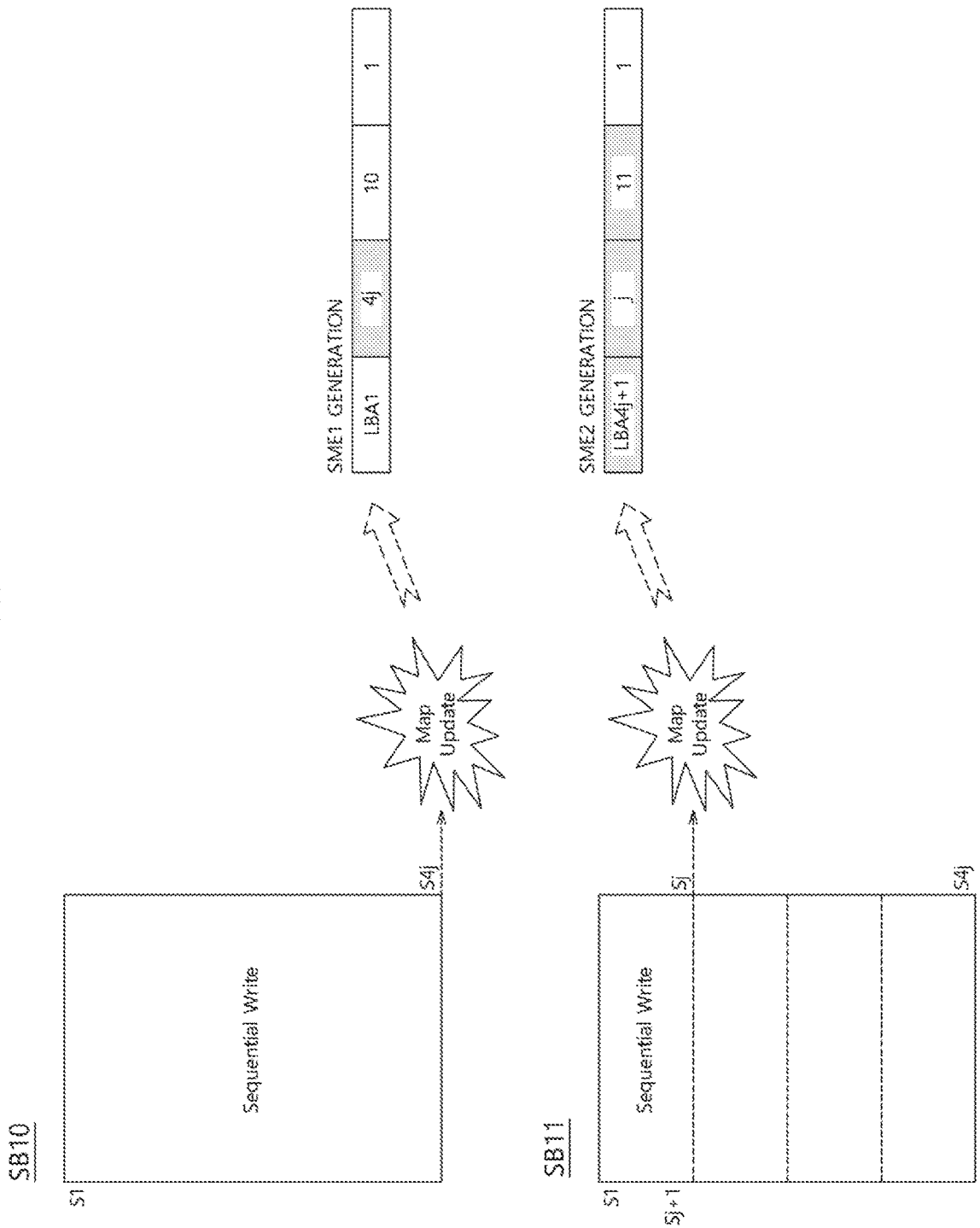
FIG. 7B is a diagram illustrating an example of generating a sequential map entry when a sequential write completed with respect to one super block is continuously performed on another super block according to an embodiment of the present disclosure.

FIG. 7B is a diagram illustrating an example of generating a sequential map entry SME when a sequential write completed with respect to one super block is continuously performed on another super block according to an embodiment.

When the sequential write completed with respect to the 10-th super block SB10 as illustrated in FIG. 7A is continuously performed from the first to the j-th sectors S1 to S$j$ of the 11-th super block SB11, the index of the super block is changed and the processor 220 may generate a new sequential map entry SME2 for the sequential logical addresses LBA4$j$+1 to LBA5$j$. The newly generated sequential map entry SME2 may include values indicating 'LBA4$j$+1' as the start logical address, 'j' as the logical address length LBA length, and the super block index '11' and the sector index '1' as the start physical address Start PBA.

When a read request is received from a host apparatus, the sequential map search engine 250 may search for a sequential map entry SME including a read-requested logical address among the sequential map entries SME stored in the sequential map table SMT through control of the processor 220. When the sequential map entry SME including the read-request logical address is present in the sequential map table SMT, the sequential map search engine 250 may provide the index value of the sequential map entry index SME Index indicating the corresponding sequential map entry SME to the processor 220. When the sequential map entry SME including the read-requested logical address is not present in the sequential map table SMT, the sequential map search engine 250 may provide a signal indicating that the sequential map entry SME including the read-requested logical address is not present to the processor 220.

The processor 220 may detect the corresponding sequential map entry SME in the sequential map table SMT based on the value of the sequential map entry index SME Index provided from the sequential map search engine 250 and calculate an offset between the start logical address Start LBA of the corresponding sequential map entry SME and the read-requested logical address. The processor 220 may control the nonvolatile memory device 100 to read data stored in a corresponding position of a calculated physical address by adding the calculated offset to the sector index of the physical address (super block index/sector index) of the sequential map entry SME and providing the calculated physical address to the nonvolatile memory device 100.

When the signal indicating that the sequential map entry SME including the read-requested logical address is not present is provided from the sequential map search engine 250, the processor 220 may determine whether or not the L2P entry corresponding to the read-requested logical address is present in the map cache buffer MCB of the RAM 240. When the L2P entry corresponding to the read-requested logical address is present in the map cache buffer MCB, the processor 220 may convert the read-requested logical address to the physical address based on the L2P entry and provide the converted physical address to the nonvolatile memory device 100.

When the L2P corresponding to the read-requested logical address is not present in the map cache buffer MCB, the processor 220 may read the map segment MS including the L2P entry corresponding to the read-requested logical address from the address map table AMT of the nonvolatile memory device 100, cache the read map segment MS in the map cache buffer MCB, search for the corresponding L2P entry in the map cache buffer MCB, and convert the read-requested logical address to the physical address based on the searched L2P entry.

Figures 8A, 8B:
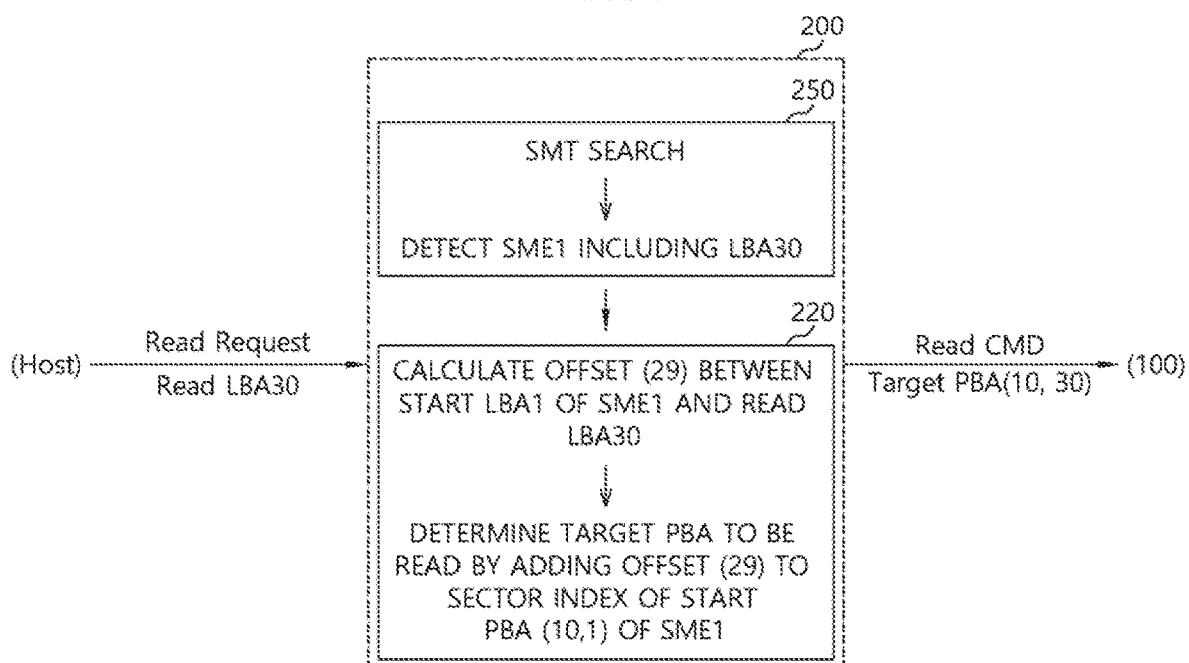
FIG. 8A is a diagram illustrating an example of a sequential map table when three sequential map entries are stored according to an embodiment of the present disclosure.
FIG. 8B is a diagram illustrating an example that a read-requested logical address is included in a sequential map entry according to an embodiment of the present disclosure.

FIG. 8A is a diagram illustrating an example of a sequential map table SMT that three sequential map entries are stored according to an embodiment and FIG. 8B is a diagram illustrating an operation when a random read-requested logical address is included in a sequential map entry SME according to an embodiment.

As illustrated in FIGS. 8A and 8B, when a random read request and a logical address LBA30 are received from a host apparatus, the processor 220 may search for the sequential map entry SME including the read-requested logical address LBA30 in the sequential map table SMT using the sequential map search engine 250. When the sequential map entry SME1 including the logical address LBA30 is searched, the processor 220 may calculate an offset '29' between the start logical address LBA1 of the searched sequential map entry SME1 and the read-requested logical address LBA30. The processor 220 may convert the logical address LBA30 to the physical address 10 as the index of the super block SB and 30 as the index of the sector by adding the offset '29' to the sector index '1' of the index '10' of the super block SB indicated by the start physical address Start PBA of the searched sequential map entry SME1.

FIG. 9 is a flowchart illustrating an operation method of the data storage apparatus 10 according to an embodiment. Specifically, FIG. 9 is the flowchart illustrating a method of generating a sequential map entry SME in the operating method of the data storage apparatus 10 according to an embodiment. The operating method of the data storage apparatus 10 according to an embodiment will be described with reference to FIG. 9 with FIGS. 1 to 8B.

In step S910, the processor 220 may determine whether or not performing map updating operation is necessary. For example, when the address buffer AB of the RAM 240 is completely filled with the P2L entries, the processor 220 may determine that the map updating operation is necessarily performed. When it is determined that the map updating operation is necessary (that is, "Yes" at step S910), the processor may proceed to step S920.

In step S920, the processor 220 may perform map updating operation by loading map segments MS to be updated from the address map table AMT of the nonvolatile memory device 100 to the map update buffer MUB of the RAM 240 based on the P2L entries of the address buffer AB, changing physical addresses included in the loaded map segments MS based on the P2L entries of the address buffer AB, and storing the updated map segments MS in the address map table AMT of the nonvolatile memory device 100.

In step S930, the processor 220 may determine whether or not sequential logical addresses are present based on the P2L entries stored in the address buffer AB. The sequential logical addresses mean consecutive logical addresses that are greater than or equal to the predetermined threshold number. When the sequential logical addresses are not present, the processor may proceed to step S910. When the sequential logical addresses are present, the processor may proceed to step S940.

In step S940, the processor 220 may determine whether or not a sequential map entry SME has an end logical address consecutive to the start logical address of the sequential logical addresses with reference to the sequential map table SMT of the RAM 240. When the sequential map entry SME has the end logical address consecutive to the start logical address of the sequential logical addresses (that is, "Yes" at step S940), the processor may proceed to step S950.

In step S950, the processor 220 may determine whether or not the super block index for the sequential logical addresses is the same as the super block index of the sequential map entry SME. When the super block index for the sequential logical addresses is the same as the super block index of the sequential map entry SME (that is, "Yes" at step S950), the processor may proceed to step S960.

In step S960, the processor 220 may update a logical address length LBA length of the sequential map entry SME to a value to which the length of the sequential logical addresses is added.

When the sequential map entry SME does not have the end logical address consecutive to the start logical address of the sequential logical addresses (that is, "No" in step S940) or when the super block index for the sequential logical addresses is not the same as the super block index of the sequential map entry SME (that is, "No" at step S950), the processor may proceed to step S970.

In step S970, the processor 220 may newly generate the sequential map entry SME for the corresponding sequential logical addresses and store the newly generated sequential map entry SME in the sequential map table SMT. Then, the processor may proceed back to step S910.

Figure 10:
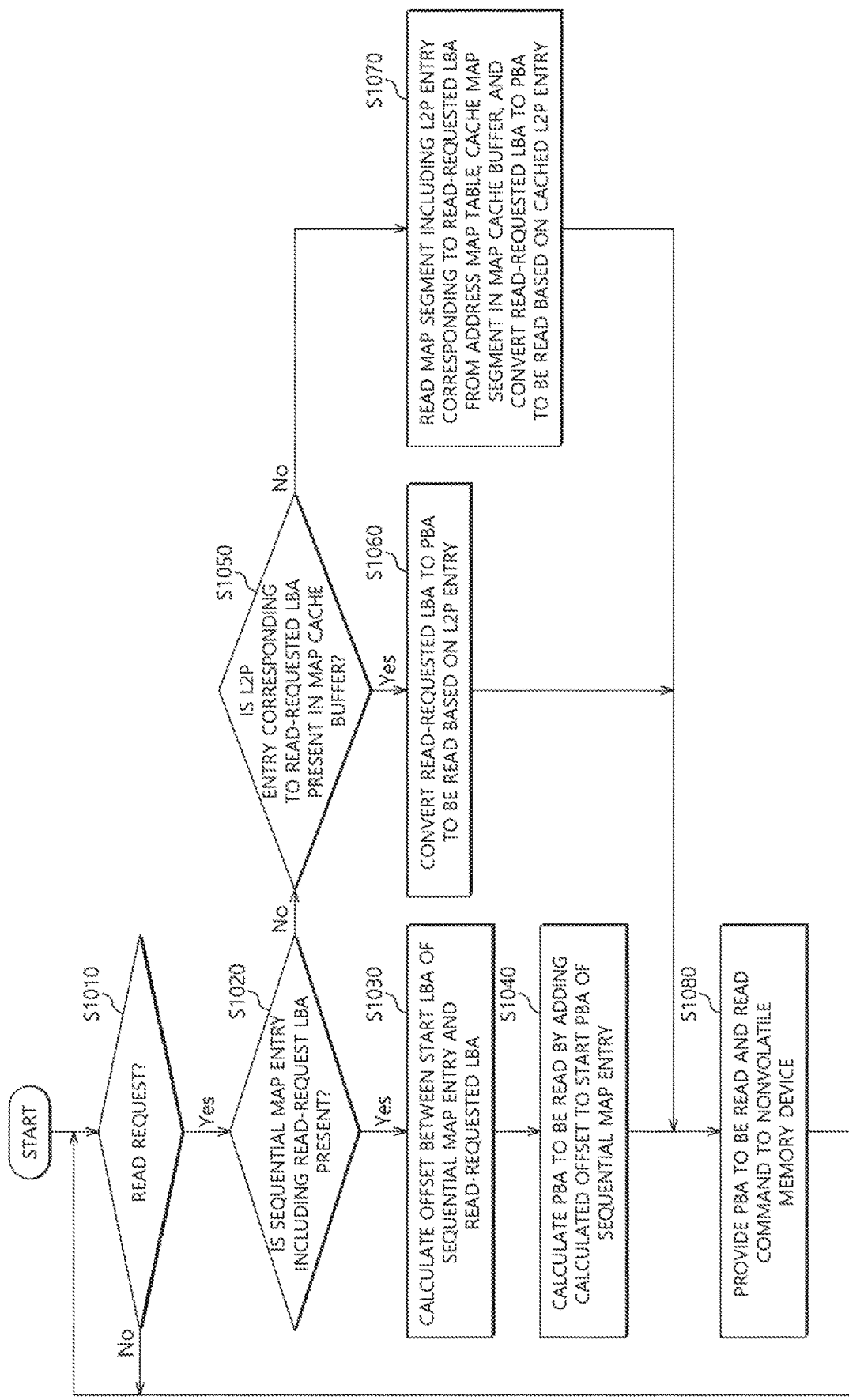
FIG. 10 is a flowchart illustrating an operation method of a data storage apparatus according to an embodiment of the present disclosure.

FIG. 10 is a flowchart illustrating an operation method of the data storage apparatus 10 according to an embodiment. Specifically, FIG. 10 is the flowchart illustrating an address conversion method according to a random read request in the operating method of the data storage apparatus 10, according to an embodiment. The operating method of the data storage apparatus 10 in FIG. 10 will be described with references FIGS. 1 to 8B.

In step S1010, the processor 220 may determine whether or not a read request is received from a host apparatus. When the read request is received from the host apparatus, the processor 220 may proceed to step S1020.

In step S1020, the processor 220 may determine whether or not a sequential map entry SME including a read-requested logical address is present in the sequential map table SMT using the sequential map search engine 250. When the sequential map entry SME including the read-requested logical address is present (that is, "Yes" at step S1020), the processor may proceed to step S1030.

In step S1030, the processor 220 may calculate an offset between a start logical address of the sequential map entry SME and the read-requested logical address.

In step S1040, the processor 220 may convert the read-requested logical address to a physical address by adding the calculated offset to the start physical address of the sequential map entry SME. For example, the offset may be added to the sector index included in the start physical address. Next, the processor may proceed to step S1080.

When the sequential map entry SME including the read-requested logical address is not present in step S1020 (that is, "No" at step S1020), the processor may proceed to step S1050.

In step S1050, the processor 220 may determine whether or not a L2P entry corresponding to the read-requested logical address is present in the map cache buffer MCB of the RAM 240. When the L2P entry corresponding to the read-requested logical address is present in the map cache buffer MCB (that is, "Yes" at step S1050), the processor may proceed to step S1060.

In step S1060, the processor 220 may convert the read-requested logical address to the physical address based on the L2P entry cached in the map cache buffer MCB. Next, the processor may proceed to step S1080.

When the L2P entry corresponding to the read-requested logical address is not present in the map cache buffer MCB in step S1050 (that is, "No" at step S1050), the processor may proceed to step S1070.

In step S1070, the processor 220 may read a map segment MS including the L2P entry corresponding to the read-requested logical address from the address map table AMT of the nonvolatile memory device 100, cache the read map segment MS in the map cache buffer MCB, and convert the read-requested logical address to the physical address based on the L2P entry cached in the map cache buffer MCB. Next, the processor may proceed to step S1080.

In step S1080, the processor 220 may provide the converted physical address and the read command to the nonvolatile memory device 100 and control the nonvolatile memory device 100 to read data from a position corresponding to the converted physical address.

Figure 11:
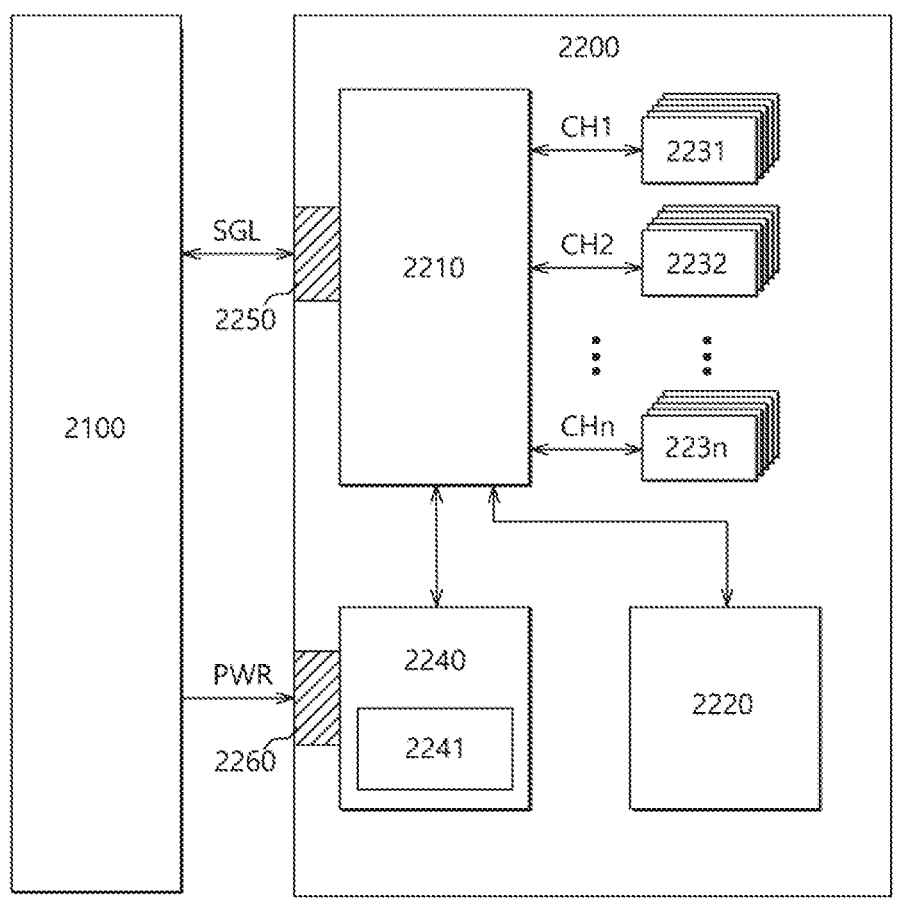
FIG. 11 is a diagram illustrating an example of a data processing system including a solid state drive (SSD) according to an embodiment of the present disclosure.

FIG. 11 is a diagram illustrating an example of a data processing system including a solid state drive (SSD) according to an embodiment. Referring to FIG. 11, a data processing system 2000 may include a host apparatus 2100 and a SSD 2200.

The SSD 2200 may include a controller 2210, a buffer memory device 2220, non-volatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 12:
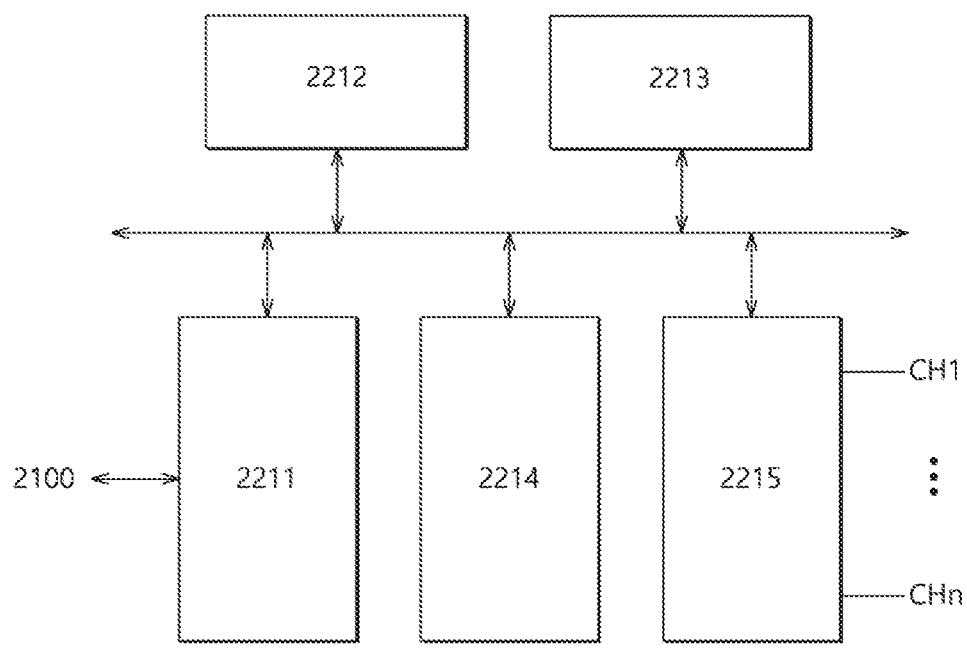
FIG. 12 is a diagram illustrating an example of a controller illustrated in FIG. 11.

FIG. 12 is a diagram illustrating an example of the controller 2210 of FIG. 11. Referring to FIG. 12, the controller 2210 may include a host interface 2211, a controller 2212, a random access memory (RAM) 2213, an error correction code (ECC) unit 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATH) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface 2211 may perform a disc emulation function that the host apparatus 2100 recognizes the SSD 2200 as a general-purpose data storage apparatus, for example, a hard disc drive HDD.

The controller 2212 may analyze and process the signal SGL input from the host apparatus 2100. The controller 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface 2215 may provide a control signal such as a command and an address to the nonvolatile memory devices 2231 to 223n according to control of the controller 2212. The memory interface 2215 may exchange data with the nonvolatile memory devices 2231 to 223n according to control of the controller 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 13:
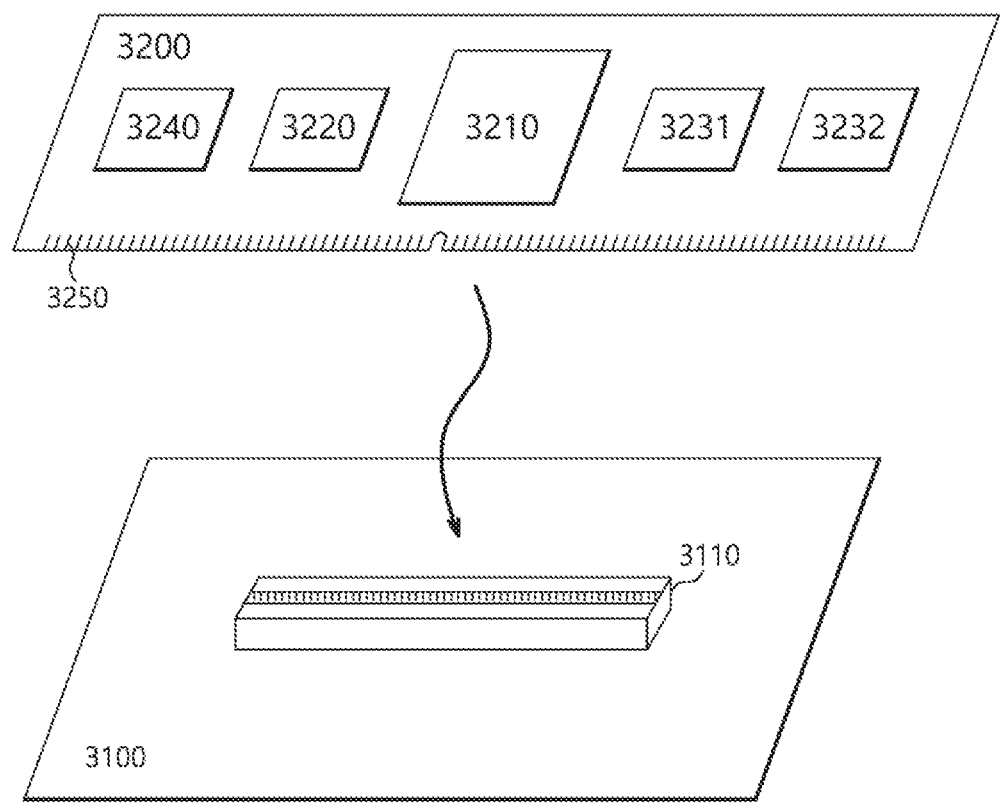
FIG. 13 is a diagram illustrating an example of a data processing system including a data storage apparatus according to an embodiment of the present disclosure.

FIG. 13 is a diagram illustrating an example of a data processing system including a data storage apparatus according to an embodiment. Referring to FIG. 13, a data processing system 3000 may include a host apparatus 3100 and a data storage apparatus 3200.

The host apparatus 3100 may be configured in a board form such as a printed circuit board (PCB). Although not shown in FIG. 13, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 12.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 14:
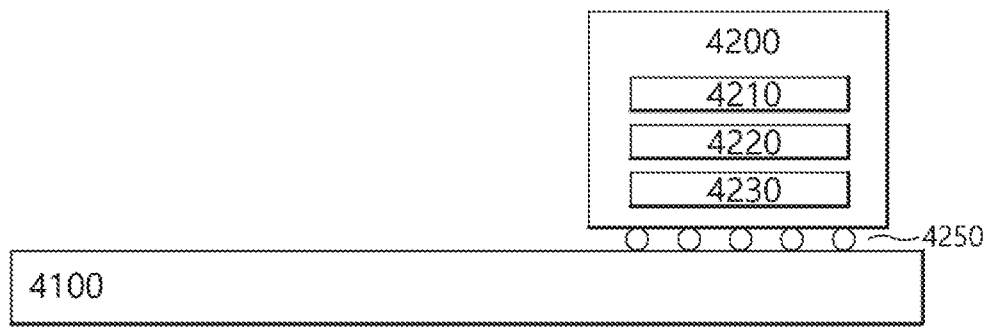
FIG. 14 is a diagram illustrating an example of a data processing system including a data storage apparatus according to an embodiment of the present disclosure.

FIG. 14 is a diagram illustrating an example of a data processing system including a data storage apparatus according to an embodiment. Referring to FIG. 14, a data processing system 4000 may include a host apparatus 4100 and a data storage apparatus 4200.

The host apparatus 4100 may be configured in a board form such as a PCB. Although not shown in FIG. 14, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 12.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 15:
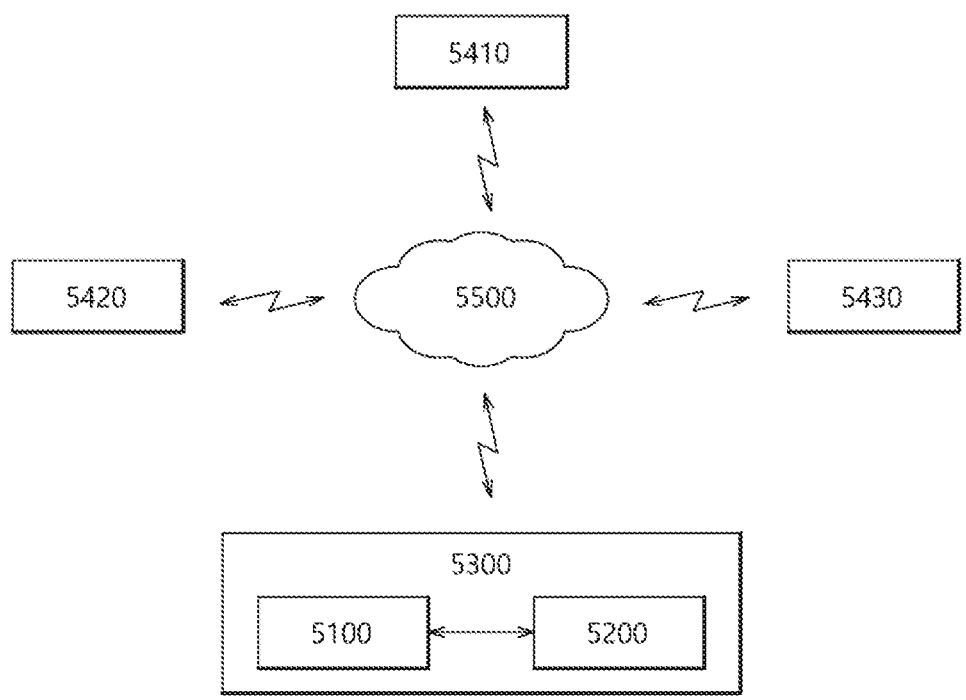
FIG. 15 is a diagram illustrating an example of a network system including a data storage apparatus according to an embodiment of the present disclosure.

FIG. 15 is a diagram illustrating an example of a network system 5000 including a data storage apparatus according to an embodiment. Referring to FIG. 15, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage apparatus 10 of FIG. 1, the data storage apparatus 2200 of FIG. 11, the data storage apparatus 3200 of FIG. 13, or the data storage apparatus 4200 of FIG. 14.

Figure 16:
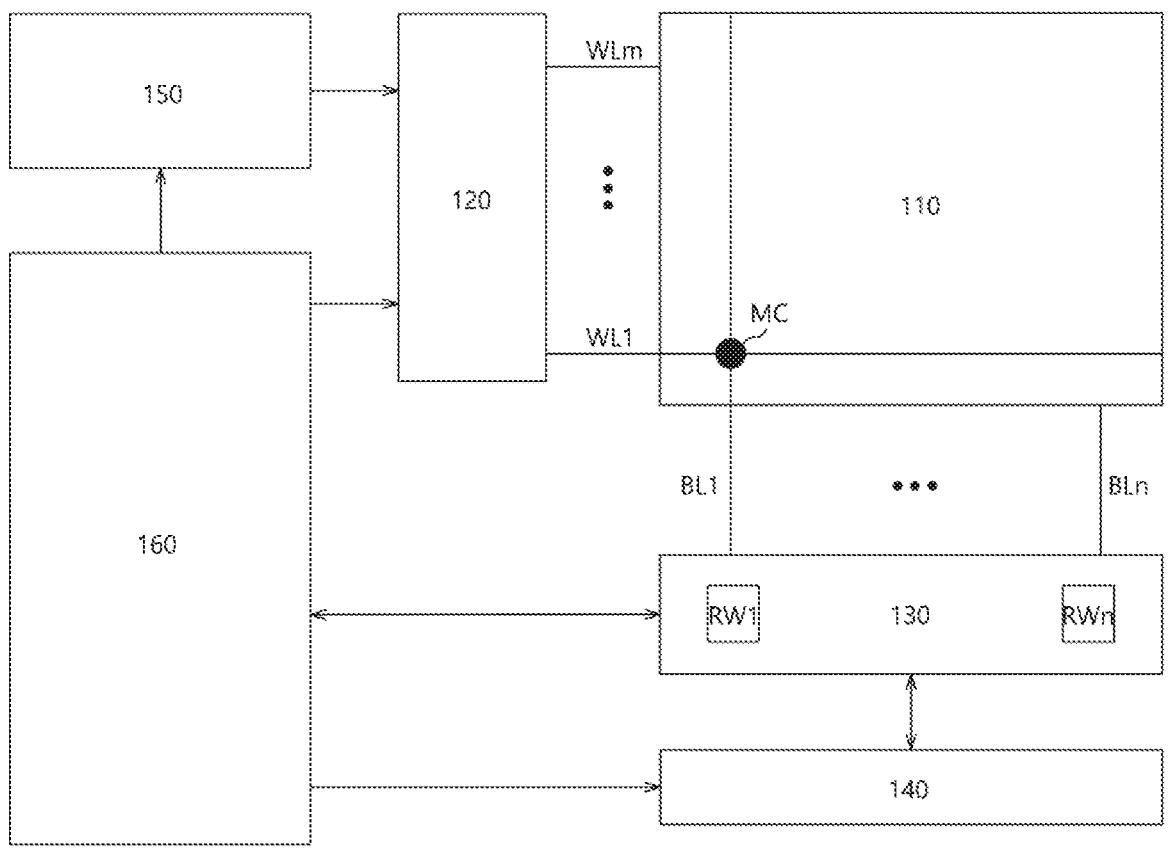
FIG. 16 is a block diagram illustrating an example of a nonvolatile memory device included in a data storage apparatus according to an embodiment of the present disclosure.

FIG. 16 is a block diagram illustrating an example of a nonvolatile memory device included in a data storage apparatus according to an embodiment. Referring to FIG. 16, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above embodiments of the present disclosure are illustrative and not limitative. Various alternatives and equivalents are possible. The examples of the embodiments are not limited by the embodiments described herein. Nor is the present disclosure limited to any specific type of semiconductor device. Other additions, subtractions, or modifications are obvious in view of the present disclosure and are intended to fall within the scope of the appended claims.

What is claimed is:

1. A data storage apparatus comprising:
a nonvolatile memory device including a plurality of block groups;
a random access memory including a sequential map table that stores a sequential map entry for consecutive sequential write logical addresses, among write addresses received from a host apparatus, greater than or equal to a predetermined threshold number; and
a processor configured to determine whether or not first sequential write logical addresses are present among logical addresses corresponding to physical addresses for a first region of a first block group when a write operation for the first region of the first block group in response to a write request received from the host apparatus is completed, generate a first sequential map entry for the first sequential write logical addresses when the first sequential write logical addresses are present, and store the first sequential map entry in the sequential map tables,
wherein, when a read request and a logical address are received from the host apparatus, the processor converts the logical address to a physical address based on a sequential map entry including the received logical address in the sequential map table.

2. The data storage apparatus of claim 1, wherein the random access memory further includes:
an address buffer in which physical to logical (P2L) entries for the first region of the first block group are stored; and
a map cache buffer in which logical to physical (L2P) entries for the logical addresses are cached.

3. The data storage apparatus of claim 2, wherein the processor determines whether or not the first sequential write logical addresses are present based on the P2L entries stored in the address buffer.

4. The data storage apparatus of claim 2, wherein the first sequential map entry includes a start logical address for the first sequential write logical addresses, a logical address length, and a start physical address among physical addresses corresponding to the first sequential write logical addresses.

5. The data storage apparatus of claim 4, wherein the first block group includes a plurality of pages including a plurality of sectors, and the start physical address of the first sequential map entry includes an index of the first block group and an index of a sector corresponding to the start logical address among the plurality of sectors.

6. The data storage apparatus of claim 4, wherein when a write for a second region consecutive to the first region of the first block group is completed and second sequential write logical addresses among logical address corresponding to physical addresses for the second region of the first block group are present, the processor determines whether or not an end logical address of the first sequential write logical addresses is consecutive to a start logical address of the second sequential write logical addresses.

7. The data storage apparatus of claim 6, wherein when the end logical address of the first sequential write logical addresses is consecutive to the start logical address of the second sequential write logical addresses, the processor changes the logical address length in the first sequential map entry to a length in which the second sequential write logical addresses are added.

8. The data storage apparatus of claim 6, wherein when the end logical address of the first sequential write logical addresses is not consecutive to the start logical address of the second sequential write logical addresses, the processor generates a second sequential map entry for the second sequential write logical addresses and stores the second sequential map entry in the sequential map table.

9. The data storage apparatus of claim 4, further comprising a sequential map search engine configured to search for the sequential map entry including the received logical address in the sequential map table and provide a search result to the processor.

10. The data storage apparatus of claim 9, wherein the processor converts the received logical address to a physical address based on the sequential map entry including the received logical address or the L2P entries stored in the map cache buffer according to the search result provided from the sequential map search engine.

11. The data storage apparatus of claim 10, wherein when an index of the sequential map entry including the received logical address is provided from the sequential map search engine, the processor calculates an offset between a start logical address of the sequential map entry corresponding to the index provided from the sequential map search engine and the received logical address, and converts the received logical address to the physical address by adding a calculated offset to the start physical address.

12. An operating method of a data storage apparatus, the method comprising:
determining whether or not consecutive first sequential logical addresses that are greater than or equal to a predetermined threshold number are present based on physical to logical (P2L) entries stored in an address buffer when map updating operation is performed;
generating a first sequential map entry including a start logical address for the first sequential logical addresses, a logical address length, and a start physical address corresponding to the start logical address when the first sequential logical addresses are present; and
converting a logical address to a physical address based on a sequential map entry including the logical address in the sequential map table when a read request and the logical address are received from the host apparatus.

13. The method of claim 12, wherein the generating of the first sequential map entry includes:
- determining whether or not a sequential map entry having an end logical address consecutive to the start logical address of the first sequential logical addresses is present, and
- generating the first sequential map entry when the sequential map entry having the end logical address consecutive to the start logical address is not present.

14. The method of claim 12, further comprising:
- determining whether or not second sequential logical addresses are present based on the P2L entries stored in the address buffer when next map updating operation is performed;
- determining whether or not an end logical address of the first sequential map entry is consecutive to a start logical address of the second sequential logical addresses; and
- changing the logical address length of the first sequential map entry to a length in which the second sequential logical addresses are added when the end logical address of the first sequential map entry is consecutive to the start logical address of the second sequential logical addresses.

15. The method of claim 14, further comprising generating a second sequential map entry for the second sequential logical addresses when the end logical address of the first sequential map entry is not consecutive to the start logical address of the second sequential logical addresses.

16. The method of claim 12, wherein the converting of the logical address includes:
- determining whether or not the sequential map entry including the received logical address is present;
- calculating an offset between the received logical address and a start logical address of the sequential map entry including the received logical address when the sequential map entry including the received logical address is present; and
- converting the received logical address to a corresponding physical address by adding a calculated offset to the start physical address of the sequential map entry including the received logical address.

17. The method of claim 16, further comprising:
- determining whether or not a logical to physical (L2P) entry corresponding to the received logical address is cached in a map cache buffer when the sequential map entry including the received logical address is not present; and
- converting the received logical address to the corresponding physical address based on the L2P entry when the L2P entry corresponding to the received logical address is cached in the map cache buffer.

18. A memory system comprising:
a memory device; and
a controller configured to:
generate, during a write operation, a sequential map entry having a start logical address, length of consecutive logical addresses from the start logical address and a start physical address corresponding to the start logical address; and
control the memory device to perform a read operation by providing a read-requested physical address, and
wherein the controller obtains the read-requested physical address based on the start logical address, a read-requested logical address, and the start physical address.

\* \* \* \* \*